US009228857B2

(12) United States Patent
Shigeta

(10) Patent No.: US 9,228,857 B2
(45) Date of Patent: Jan. 5, 2016

(54) POSITION DETECTION APPARATUS HAVING A DETERMINING UNIT TO DETERMINE THE RELIABILITY OF CALCULATED POSITION OF A MOVABLE MEMBER

(71) Applicant: CANON KABUSHIKI KAISHA, Tokyo (JP)

(72) Inventor: Junji Shigeta, Utsunomiya (JP)

(73) Assignee: CANON KABUSHIKI KAISHA (JP)

( * ) Notice: Subject to any disclaimer, the term of this patent is extended or adjusted under 35 U.S.C. 154(b) by 70 days.

(21) Appl. No.: 14/249,491

(22) Filed: Apr. 10, 2014

(65) Prior Publication Data
US 2014/0306102 A1      Oct. 16, 2014

(30) Foreign Application Priority Data

Apr. 12, 2013   (JP) .................................. 2013-083505

(51) Int. Cl.
*G01D 5/34*   (2006.01)
*G01D 5/347*   (2006.01)
*G01D 5/244*   (2006.01)

(52) U.S. Cl.
CPC ............ *G01D 5/347* (2013.01); *G01D 5/24461* (2013.01); *G01D 5/24466* (2013.01); *G01D 5/34746* (2013.01); *G01D 5/34792* (2013.01); *G01D 5/24476* (2013.01)

(58) Field of Classification Search
CPC .......... G01D 5/34776; G01D 5/24476; G01D 5/24466; G01B 11/026
USPC ........ 250/231.13–231.18, 221, 214 R, 214.1; 341/11, 13
See application file for complete search history.

(56) References Cited

U.S. PATENT DOCUMENTS 7,414,575 B2 *   8/2008   Watanabe et al. ........ 342/357.37

FOREIGN PATENT DOCUMENTS

| EP | 2581713 A2 | 4/2013 |
| JP | 05-45151 A | 2/1993 |
| JP | 08-304113 A | 11/1996 |

(Continued)

OTHER PUBLICATIONS

European Search Report issued in European counterpart application No. EP14001164.4, dated Sep. 17, 2015.

*Primary Examiner* — Que T Le
(74) *Attorney, Agent, or Firm* — Rossi, Kimms & McDowell LLP

(57) ABSTRACT

A position detector which detects the position of a movable member relative to a fixed member includes a signal detector configured to detect periodic signals which respectively indicate predetermined values concerning the position of the movable member relative to the fixed member and change at different periods in accordance with a position change, a signal processor configured to generate displacement signals based on the periodic signals detected by the signal detector and sequentially output the generated displacement signals while switching the signals at a predetermined period, a position calculator configured to calculate a position of the movable member relative to the fixed member based on the displacement signals, and a reliability determining unit configured to determine that the reliability of the position calculated by the position calculator is low, if the displacement amount of the movable member in the predetermined period is larger than a predetermined threshold.

7 Claims, 9 Drawing Sheets

(56) References Cited

FOREIGN PATENT DOCUMENTS

| JP | 08304113 A | 11/1996 |
| JP | 2003-083767 A | 3/2003 |
| JP | 2012-173168 A | 9/2012 |

* cited by examiner

*FIG. 6A* Atan1
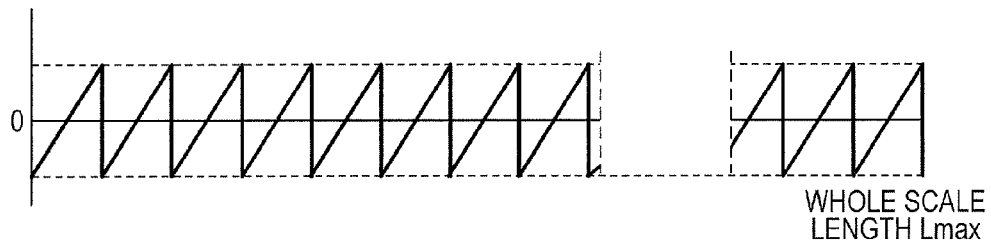
*FIG. 6B* Inc1
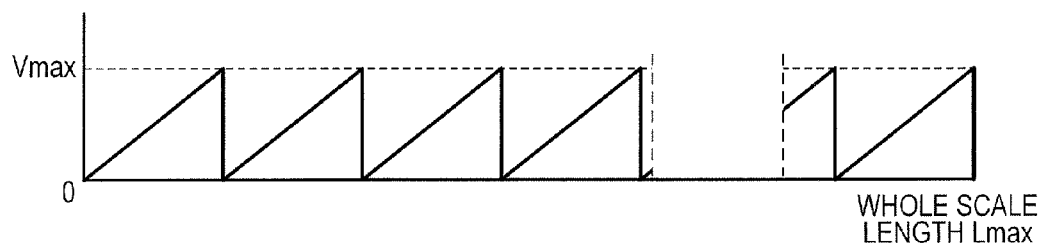
*FIG. 6C* Inc2
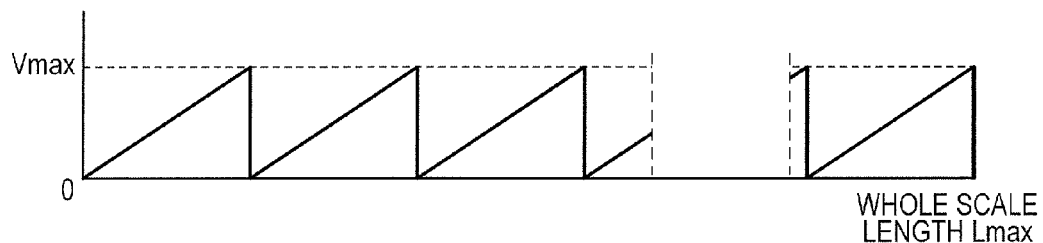
*FIG. 6D* Pv1
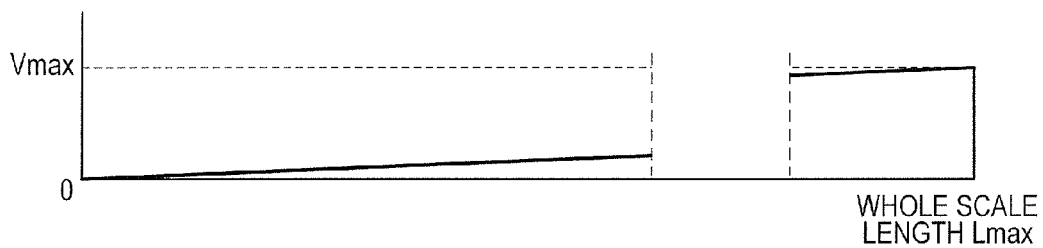

POSITION DETECTION APPARATUS HAVING A DETERMINING UNIT TO DETERMINE THE RELIABILITY OF CALCULATED POSITION OF A MOVABLE MEMBER

BACKGROUND OF THE INVENTION

1. Field of the Invention

The present invention relates to a position detection apparatus which detects the position of a movable member relative to a fixed member.

2. Description of the Related Art

Conventionally, as an apparatus for measuring the moving distance of an object, there is known, an absolute encoder which can measure an absolute position as well as an incremental encoder which measures a relative moving distance.

Japanese Patent Application Laid-Open No. H08-304113 discloses a Vernier-type absolute encoder. This encoder is configured to have a main track constituted by lattice patterns with different pitches and at least one sub-track. The encoder performs absolutization in one circulation interval based on the slight shifts between detection signals originating from the pitch differences between the respective tracks.

In addition, Japanese Patent Application Laid-Open No. H05-45151 discloses an invention concerning the timing of absolutization in a Vernier-type absolute encoder. This encoder is configured to have tracks formed with fine coarse pitches. When performing absolutization from these tracks, the encoder performs the absolutization at the timing when the velocity drops to the velocity at which no false detection occurs in incremental measurement with the fine pitch.

However, the absolute encoder disclosed in Japanese Patent Application Laid-Open No. H08-304113 has the following problem. In general, when calculating an absolute position from signals originating from a plurality of tracks, it is necessary to ensure synchronization between the signals originating from the respective tracks of the absolute encoder. This is because of the premise that, signals originating from a plurality of tracks are those obtained when the position of a measurement target object remains the same or within a given allowable range. Assume that the encoder time-divisionally detects signals originating from a plurality of tracks. In this case, if a measurement target object is in a state of movement, the respective signals originating from the plurality of tracks become signals at the different positions of the measurement target object. This breaks the above premise, leading to a problem that the encoder cannot calculate a correct absolute position. In addition, there is also available a method of ensuring synchronization between a plurality of track signals by using a sample/hold circuit and the like. This however raises a problem that the addition of a circuit, will increase the cost and it takes more time to hold signals.

In addition, the absolute encoder disclosed in Japanese Patent Application Laid-Open No. H05-45151 has the following problem. A false detection, in Japanese Patent Application Laid-Open No. H05-45151 is not based on the premise that the encoder time-divisionally detects signals originating from a plurality of tracks, and hence only a false detection occurs in incremental measurement with the fine pitch. In order to calculate a correct, absolution position, however, it is important that each of signals originating from a plurality of tracks is the one at the position of a measurement target object within a given allowable range. Even if, therefore, there is no false detection in incremental measurement with the fine pitch, it cannot be said that the encoder ensures the synchronization between signals originating from a plurality of tracks, and it is not possible to calculate a correct absolute position. That is, if the encoder determines the calculation of an absolute position based on a false detection in incremental measurement with the fine pitch, the encoder calculates a wrong absolute position.

SUMMARY OF THE INVENTION

The present invention provides a position detection apparatus which detects a position of a movable member relative to a fixed member, comprising a signal detector configured to detect, a plurality of periodic signals which respectively indicate predetermined values concerning a position of the movable member relative to the fixed member and change at different periods in accordance with a change in the position, a signal processing unit configured to generate a plurality of displacement signals based on the plurality of periodic signals detected by the signal detector and sequentially output the plurality of generated displacement signals while switching the signals at a predetermined period, a position calculating unit configured to calculate a position of the movable member relative to the fixed member based on the plurality of displacement signals, and a reliability determining unit, configured to determine that reliability of the position calculated by the position calculating unit is low, if a displacement amount of the movable member in the predetermined period is larger than a predetermined threshold.

The present invention can provide a highly reliable position detection apparatus which can prevent erroneous absolute position calculation while implementing the miniaturization of a circuit arrangement.

Further features of the present invention will become apparent from the following description of exemplary embodiments with reference to the attached drawings.

BRIEF DESCRIPTION OF THE DRAWINGS

FIG. 6A is a graph showing the first and second relative position signals and a Vernier signal.

FIG. 6B is a graph showing the first, and second relative position signals and a Vernier signal.

FIG. 6C is a graph showing the first, and second relative position signals and a Vernier signal.

FIG. 6D is a graph showing the first, and second relative position signals and a Vernier signal.

DESCRIPTION OF THE EMBODIMENTS

Preferred embodiments of the present invention will now be described in detail in accordance with the accompanying drawings.

First Embodiment

The first embodiment of a position detection apparatus of the present, invention will be described below with reference to FIG. 1.

Figure 1:
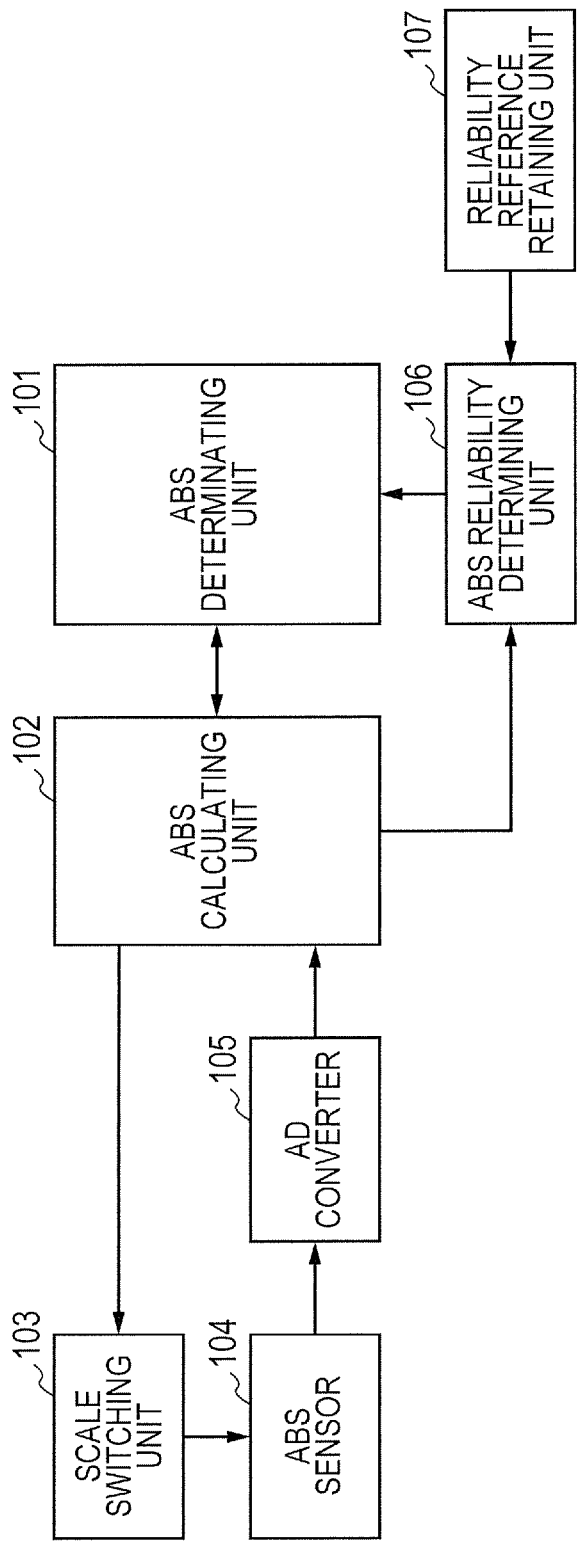
FIG. 1 is a block diagram showing the arrangement of the first embodiment.

FIG. 1 is a block diagram showing the arrangement of the first, embodiment. Referring to FIG. 1, an ABS calculating unit (position calculating unit) 102 is a calculating unit, which calculates an absolute position Pabs as the position of a movable member relative to a fixed member based on the signal output from an ABS sensor. A scale switching unit (switching unit) 103 switches between two types of signal outputs generated by two types of track patterns which are output from an ABS sensor 104. The ABS sensor (signal detector) 104 is an absolute position sensor which outputs a signal for calculating the absolute position of a movable member relative to a fixed member. The internal arrangement of the ABS sensor 104 and its output signal will be described later. An AD converter 105 converts the analog signal output from the ABS sensor 104 into a digital signal. An ABS reliability determining unit (reliability determining unit) 106 is a reliability determining unit which determines the reliability of the absolute position calculated by the ABS calculating unit. A reliability reference retaining unit 107 is a nonvolatile memory such as an EEPROM which stores and retains data for determining the reliability of an absolute position. An ABS determining unit 101 is an absolute position determining unit which determines the absolute position Pabs calculated by the ABS calculating unit 102, based on the determination result obtained by the ABS reliability determining unit. The ABS determining unit 101, the ABS calculating unit 102, and the ABS reliability determining unit 106 are arranged in, for example, a single CPU.

The operation of this embodiment will be described next.

The ABS determining unit 101 requests the ABS calculating unit 102 to calculate the absolute position Pabs. Upon receiving an absolute position calculation request from the ABS determining unit 101, the ABS calculating unit 102 outputs a command to the scale switching unit 103 to sequentially output signals originating from two types of track patterns from the ABS sensor 104. The scale switching unit 103 issues an instruction to the ABS sensor 104 to sequentially output, signals originating from two types of track patterns. The ABS sensor 104 sequentially outputs signals originating from the two types of track patterns in accordance with the instruction from the scale switching unit 103. The AD converter 105 converts the signals originating from the two types of track patterns, output from the ABS sensor, into digital signals, and outputs them to the ABS calculating unit 102. The ABS calculating unit calculates the absolute position Pabs based on the signals originating from the two types of track patterns and outputs the absolute position Pabs to the ABS determining unit 101. An absolute position calculation method will be described later. On the other hand, the ABS calculating unit 102 outputs absolute position calculation information to the ABS reliability determining unit 106. The ABS reliability determining unit 106 determines the reliability of the absolute position Pabs calculated by the ABS calculating unit 102, based on the absolute position calculation information and the reliability determination reference data retained by the reliability reference retaining unit 107, and outputs the determination result to the ABS determining unit 101. Absolute position calculation information and absolute position reliability determination will be described later. The ABS determining unit 101 determines whether to determine the absolute position Pabs calculated by the ABS calculating unit 102, based on the determination result on the reliability of the absolute position Pabs which is output from the ABS reliability determining unit 106. When determining the absolute position Pabs, the ABS reliability determining unit 106 determines the absolute position calculated by the ABS calculating unit 102. When not determining the absolute position Pabs, the ABS reliability determining unit 106 requests the ABS calculating unit 102 to re-calculate the absolute position Pabs. The ABS calculating unit 102 re-calculates the absolute position Pabs in accordance with the request from the ABS determining unit 101. The apparatus executes the above processing until the determination of an absolute position.

The internal arrangement of the ABS sensor 104 and its output, signal will be described next.

Figure 2:
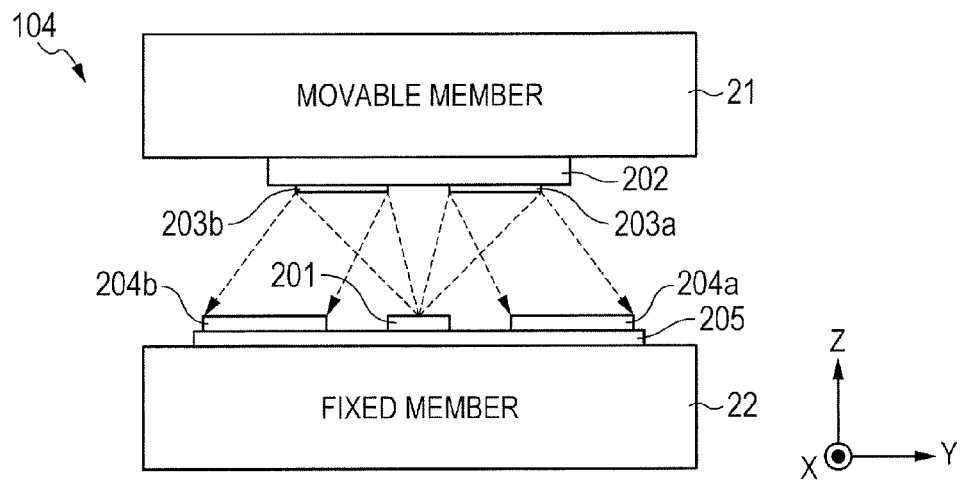
FIG. 2 is a sectional view of an ABS sensor.

FIG. 2 is a sectional view of the ABS sensor (signal detector) 104. Referring to FIG. 2, a movable member 21 is a movable portion which can move in the X-axis direction as a vertical direction relative to the drawing surface. A fixed member 22 is a member serving as a reference for the absolute position of the movable member 21. A light source 201 is a light emitting unit, for example, an LED. A scale portion 202 includes two track patterns 203a and 203b, each of which is formed throughout, the whole length of the scale portion 202 at equal intervals with numbers of slits different from each other. Light receiving units 204a and 204b respectively receive light beams emitted from the light source 201 and reflected by the track patterns 203a and 203b. Each of the light receiving units is formed from, for example, a photodiode array. A signal processing circuit (signal processing unit) 205 processes the signal received by the light receiving units 204a and 204b and outputs a signal originating from one of the track patterns 203a and 203b in accordance with a switching signal from the scale switching unit 103. Note that this embodiment has exemplified the arrangement in which the movable member 21 includes the scale portion 202, and the fixed member 22 includes the light source 201 and the light receiving units 204a and 204b. However, the embodiment, is not limited to this and may have an arrangement in which one of the fixed member and the movable member is provided with the scale portion 202, and the other member is provided with the light source 201 and the light receiving units 204a and 204b. This also applies to embodiments to be described later.

Figure 3:
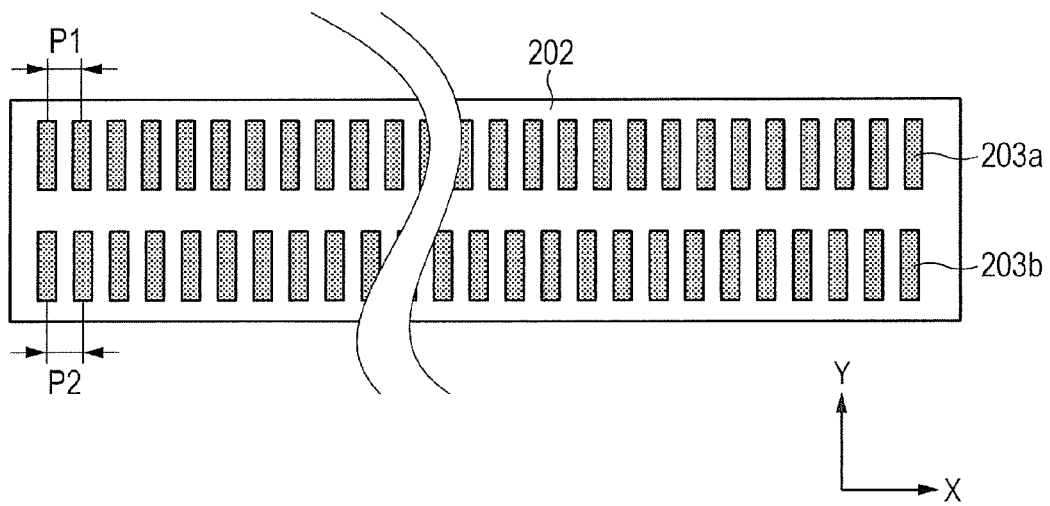
FIG. 3 is a plan view of a scale portion.

FIG. 3 is a plan view of the scale portion 202 in this embodiment. FIG. 3 shows a reflective slit pattern (reflective pattern array) as an example. The scale portion 202 is configured to have two track patterns, namely the first track pattern 203a and the second track pattern 203b. When light from the light source 201 strikes the reflective portions (black portions) of the track patterns 203a and 203b, the light is reflected to the light, receiving units 204a and 204b. The reflective portions of the first track pattern 203a are formed at equal intervals of P1. The reflective portions of the second track pattern 203b are formed at equal intervals of P2. In this embodiment, P1 is set to arrange 40 reflective portions throughout a whole scale length Lmax (maximum displacement), that is, 40 periods throughout a whole length L (within the maximum displacement). In addition, P2 is set to arrange 39 reflective portions throughout the total scale length Lmax, that is, 39 periods throughout a whole length L.

Figure 4:
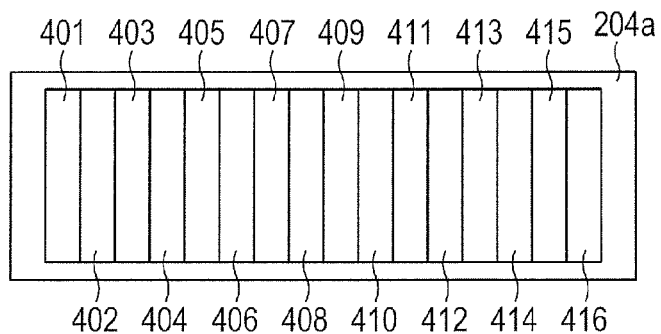
FIG. 4 is a plan view of a light receiving unit.

FIG. 4 is a plan view of the light, receiving unit 204a. In this case, both the light receiving unit 204b and the light receiving unit 204a have the same arrangement. The light receiving unit 204a has 16 photodiodes 401 to 416 arranged at equal intervals in the horizontal direction. The photodiodes 401, 405, 409, and 413 are electrically connected to each other. This group is referred to as an a-phase. In addition, a group of the photodiodes 402, 406, 410, and 414 will be referred to as a b-phase. Likewise, a group of the photodiodes 403, 407, 411, and 415 and a group of photodiodes 404, 408, 412, and 416 will be referred to as a c-phase and a d-phase, respectively. This embodiment will be described on the premise that, the interval of four photodiodes in the light, receiving unit 204a (for example, the interval of the photodiodes 401 to 404) is twice the interval P1 of the reflective portions of the first track pattern 203a. In this case, since the distance from the light source 201 to the reflective portions of the first track pattern 203a is twice the distance from the light, source 201 to the light receiving unit 204a, the width of reflected light received by the light receiving unit 204a is twice the width of the reflective portion. The interval of four photodiodes in the light receiving unit 204a therefore corresponds to one period of the first track pattern 203a.

When the light receiving unit 204a receives light emitted from the light source 201 and reflected by the first track pattern 203a, the respective photodiode groups of the a-phase, b-phase, c-phase, and d-phase output photocurrents corresponding to the amounts of light, received. In this case, as the scale portion 202 moves in the X-axis direction, the respective photodiode groups of the a-phase, b-phase, c-phase, and d-phase of the scale portion 202 operate such that the b-phase, c-phase, and d-phase respectively output currents (periodic signals) which vary according to a phase relationship of 90°, 130°, and 270° with reference to the a-phase. The signal processing circuit 205 converts output currents into voltages by using a current/voltage converter. The signal processing circuit 205 then obtains the differential component between the a-phase and the c-phase and the differential component between the b-phase and the d-phase by using a differential amplifier. Subsequently, the signal processing circuit 205 generates a first phase-A displacement signal S1r A as a phase-A displacement signal and a first phase-B displacement signal S1r B as a phase-B displacement signal, both of which originate from the first track pattern 203a and are 90° out of phase from each other, from the differential component between the a-phase and the c-phase and the differential component between the b-phase and the d-phase. The light receiving unit 204b also generates a second phase-A displacement signal S2rA as a phase-A displacement signal and a second phase-B displacement signal S2rB as a phase-B displacement signal by the same method, both of which originate from the second track pattern 203b.

In this case, the signal processing circuit 205 outputs either the first phase-A displacement signal S1r A and the first phase-B displacement signal S1r B or the second phase-A displacement signal S2rA and the second phase-B displacement signal S2rB in accordance with a switching signal from the scale switching unit 103. With the above operation, the ABS sensor 104 outputs either the first phase-A displacement, signal S1r A and the first phase-B displacement signal S1r B or the second phase-A displacement signal S2rA and the second phase-B displacement signal S2rB to the AD converter 105 in accordance with a switching signal from the scale switching unit 103.

An absolute position calculation method will be described next.

The ABS calculating unit 102 calculates an absolute position. The ABS calculating unit starts processing in step S501 in the flowchart of FIG. 5 which shows absolute position calculation. The process then advances to step S502.

In step S502, the ABS calculating unit, corrects the first phase-A displacement signal S1r A and the first phase-B displacement signal S1r B. In this case, the first phase-A displacement, signal S1r A and the first phase-B displacement signal S1r B sometimes differ from each other in signal offset, and signal amplitude. Performing absolute position calculation by using such signals without any change will cause an error in the calculated absolute position Pabs. It is therefore necessary to correct the signals. In this embodiment, as described above, the interval of four photodiodes in the light receiving unit 204a (for example, the interval of the photodiodes 401 to 404) is twice the interval P1 of the reflective portions of the first track pattern 203a. Therefore, the first phase-A displacement signal S1r A and the first phase-B displacement, signal S1r B are expressed as follows:

$$S1rA: a1 \times COS\ \theta + s1 \quad (1)$$

$$S1rB: a2 \times SIN\ \theta + s2 \quad (2)$$

where a1 and s1 are respectively the amplitude and offset of the first phase-A displacement signal S1r A, a2 and s2 are respectively the amplitude and offset of the first phase-B displacement signal S1r B, and θ is the phase of a signal. The maximum value, minimum value, signal amplitude, and average value of the first phase-A displacement signal S1r A are respectively given as s1+a1, s1−a1, a1, and s1. Likewise, the maximum value, minimum value, signal amplitude, and average value of the phase-B displacement signal S1r B are respectively given as s2+a2, s2−a2, a2, and s2. When the first phase-A displacement signal S1r A and the first phase-B displacement signal S1r B represented by expressions (1) and (2) are corrected by using these values, a first phase-A displacement signal S1cA and a first phase-B displacement signal S1cB after the correction are respectively represented by:

$$S1cA: \{(a1 \times COS\ \theta + s1) - s1\} \times a2 = a1 \times a2 \times COS\ \theta \quad (3)$$

$$S1cB: \{(a2 \times SIN\ \theta + s2) - s2\} \times a1 = a1 \times a2 \times SIN\ \theta \quad (4)$$

As a result, the offsets of the first phase-A displacement signal S1r A and first phase-B displacement signal S1r B are removed to obtain the first phase-A displacement signal S1cA and the first phase-B displacement signal S1cB having the same signal amplitude.

When the ABS calculating unit, corrects the first phase-A displacement signal S1r A and the first phase-B displacement signal S1r B in the above manner in step S502, the process advances to step S503.

In step S503, the ABS calculating unit, performs arc tangent calculation by using the first phase-A displacement signal S1cA and the first phase-B displacement, signal S1cB after the correction to calculate a signal Atan1 shown in FIG. 6A. In this case, the first track pattern 203a is a pattern having 40 periods with respect to a whole scale length Lmax. The signal Atan1 has therefore 80 periods with respect to the total scale length. The ABS calculating unit then calculates a first relative position, signal Inc1 having an amplitude Vmax and 40 periods with respect to the total scale length from Atan1. More specifically, the ABS calculating unit calculates the first relative position signal Inc1 by applying a gain to the signal Atan1 to make it have an amplitude Vmax/2 and adding Vmax/2 to the signal when the phase is between 180° and 360°, with the signal level being 0 when the phase of the first phase-B displacement signal S1r B is 0°. As a consequence, the first relative position signal Inc1 becomes a saw-tooth wave having 40 periods with respect to the whole scale length Lmax, as shown in FIG. 6B.

The abscissa of each of FIGS. 6A, 6B, 6C and 6D represents the position relative to the whole scale length Lmax; and the ordinate, the corresponding signal level.

After calculation of the first relative position signal Inc1 in step S503, the process advances to step S504.

In step S504, the ABS calculating unit, corrects the second phase-A displacement signal S2rA and the second phase-B displacement signal S2rB.

Since the light receiving unit 204b and the light, receiving unit 204a have the same arrangement as each other, the interval of four photodiodes in the light, receiving unit 204b (for example, the interval of the photodiodes 401 to 404) is twice the interval P1 of the reflective portions of the first track pattern 203a. In this case, the interval P1 of the reflective portions of the first track pattern 203a differs from the interval P2 of the reflective portions of the second track pattern 203b. Therefore, the interval of four photodiodes in the light receiving unit 204b (for example, the interval of the photodiodes 401 to 404) is not twice the interval P2 of the reflective portions of the second track pattern 203b. For this reason, the second phase-A displacement signal S2rA and the second phase-B displacement signal S2rB are 90° out of phase from each other.

The second phase-A displacement signal S2rA and the second phase-B displacement signal S2rB are therefore respectively represented by $$S2rA : b1 \times COS\ \theta + t1 \qquad (5)$$

$$S2rB : b2 \times SIN(\theta + \alpha) + t2 \qquad (6)$$

where b1 and t1 are respectively the amplitude and offset of the second phase-A displacement, signal S2rA, b2 and t2 are respectively the amplitude and offset of the second phase-B displacement signal S2rB, θ is the phase of a signal, and α is a phase shift amount. When the ABS calculating unit corrects the second phase-A displacement signal S2rA and the second phase-B displacement signal S2rB in the same manner as in the processing in step S502, a second phase-A displacement signal S2cA' and a second phase-B displacement, signal S2cB' after the correction are represented by $$S2cA' : \{(b1 \times COS\ \theta + t1) - t1\} \times b2 = b1 \times b2 \times COS\ \theta \qquad (7)$$

$$S2cB' : \{(b2 \times SIN(\theta + \alpha) + t2) - t2\} \times b1 = b1 \times b2 \times SIN(\theta + \alpha) \qquad (8)$$

As a result, the offset t1 of the second phase-A displacement signal S2rA and the offset t2 of second phase-B displacement signal S2rB are removed to obtain the second phase-A displacement signal S2cA' and the second phase-B displacement signal S2cE' having the same signal amplitude.

The processing of making the second phase-A displacement signal S2cA' and the second phase-B displacement signal S2cB' have a phase difference of 90° will be described next by using expressions (7) and (8).

The difference and sum of expressions (7) and (8) are respectively represented by $$b1 \times b2 \times (SIN(\theta + \alpha) - COS\theta) = \\ b1 \times b2 \times 2 \times SIN\{(\alpha - 90)/2\} \times COS\{\theta + (\alpha + 90)/2\} \qquad (9)$$

$$b1 \times b2 \times (SIN(\theta + \alpha) + COS\theta) = \\ b1 \times b2 \times 2 \times COS\{(\alpha - 90)/2\} \times SIN\{\theta + (\alpha + 90)/2\} \qquad (10)$$

According to expressions (9) and (10), the phase difference is 90°.

In this case, since expressions (9) and (10) differ in amplitude, the ABS calculating unit corrects the amplitudes to calculate a second phase-A displacement signal S2cA and a second phase-B displacement signal S2cB having the same signal amplitude. Following expressions (11) and (12) can be obtained by multiplying expression (9) by COS $\{(\alpha-90)/2\}$ as a part of the amplitude of expression (10) and multiplying expression (10) by SIN $\{(\alpha-90)/2\}$ as a part of the amplitude of expression (9):

second phase-A displacement signal S2cA:

$$b1 \times b2 \times 2 \times SIN\ \{(\alpha-90)/2\} \times COS\ \{(\alpha-90)/2\} \times COS\ \{\theta+(\alpha+90)/2\} \qquad (11)$$

second phase-A displacement signal S2cA:

$$b1 \times b2 \times 2 \times SIN\ \{(\alpha-90)/2\} \times COS\ \{(\alpha-90)/2\} \times SIN\ \{\theta+(\alpha+90)/2\} \qquad (12)$$

As a result, the offsets of the second phase-A displacement signal S2rA and second phase-B displacement signal S2rB are removed to obtain the second phase-A displacement signal S2cA and the second phase-B displacement signal S2cB having the same signal amplitude.

When the ABS calculating unit corrects the second phase-A displacement signal S2rA and the second phase-B displacement signal S2rB in the above manner in step S504, the process advances to step S505.

In step S505, the ABS calculating unit calculates a second relative position signal Inc2 by performing the same calculation as that in step S503 by using the second phase-A displacement signal S2cA and the second phase-B displacement signal S2cB after the correction. In this case, the second track pattern 203b is a pattern having 39 periods with respect to the whole scale length Lmax. Therefore, the second relative position signal Inc2 becomes a saw-tooth wave having 39 periods with respect to the whole scale length Lmax, as shown in FIG. 6C. The abscissa of each of FIGS. 6A, 6B, 6C and 6D represents the position relative to the whole scale length Lmax; and the ordinate, the corresponding signal level.

After calculation of the second relative position signal Inc2 in step S505, the process advances to step S506.

In step S506, the ABS calculating unit obtains a Vernier signal Pv1 shown in FIG. 61) by calculating the difference between the first relative position signal Inc1 and the second relative position signal Inc2 and adding Vmax when the difference is a negative value. In this case, since the period difference between the first relative position signal Inc1 and the second relative position signal Inc2 with respect to the whole scale length Lmax is one, the Vernier signal Pv1 has a saw-tooth wave having one period with respect to the whole scale length Lmax.

After calculation of the Vernier signal Pv1 in step S506, the process advances to step S507.

In step S507, the ABS calculating unit calculates the absolute position Pabs.

In this case, S1r A, S1r B, S2rA, and S2rB contain noise components due to disturbances and the like, and hence the first relative position signal Inc1 and the second relative position signal Inc2 calculated from S1rA, S1rB, S2rA, and S2rB also contain noise components. In addition, the first relative position signal Inc1 and the second relative position signal Inc2 undergo phase shifts due to a signal acquisition delay concerning S1rA, S1rB, S2rA, and S2rB and the movement of the movable member 21 during the signal acquisition delay time. In order to correct an error component E caused by these noise components and phase shift amounts, the ABS calculating unit, performs synchronization calculation of the Vernier signal Pv1 and the first relative position signal Inc1. The ABS calculating unit performs the above synchronization calculation to calculate a signal, as a signal level Vabs indicating an absolute position, by combining the Vernier signal Pv1 as a higher-order signal and the first relative position signal Inc1 as a lower-order signal. The ABS calculating unit calculates Pabs from Vabs. A method of calculating Pabs from Vabs will be described later.

FIGS. 7A, 7B, 7C, and 7D show how the waveform changes by the synchronization calculation.

The abscissa of each of FIGS. 7A, 7B, 7C and 7D represents the position relative to the whole scale length Lmax; and the ordinate, the corresponding signal level. In addition, letting Vmax be the maximum value of the signal level and N1 be an area corresponding to a specific period counted from the start point, of the scale, the number of periods (maximum number N1) within the whole scale length Lmax is defined as N1max. In this embodiment, since the first track pattern 203a has 40 periods with respect to the whole scale length Lmax of the scale, N1max is 40, and N1 is a natural number in a range from 1 to 40.

Figure 7A:
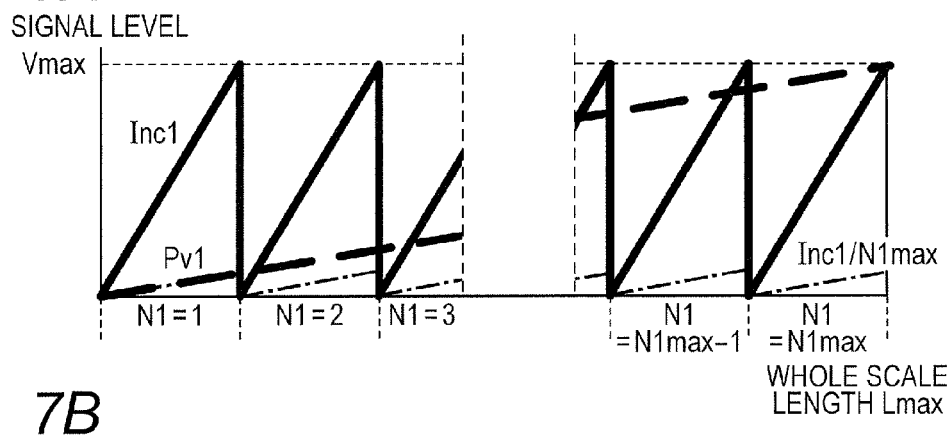
FIG. 7A is a graph showing changes in waveform in synchronization calculation.
Figure 7B:
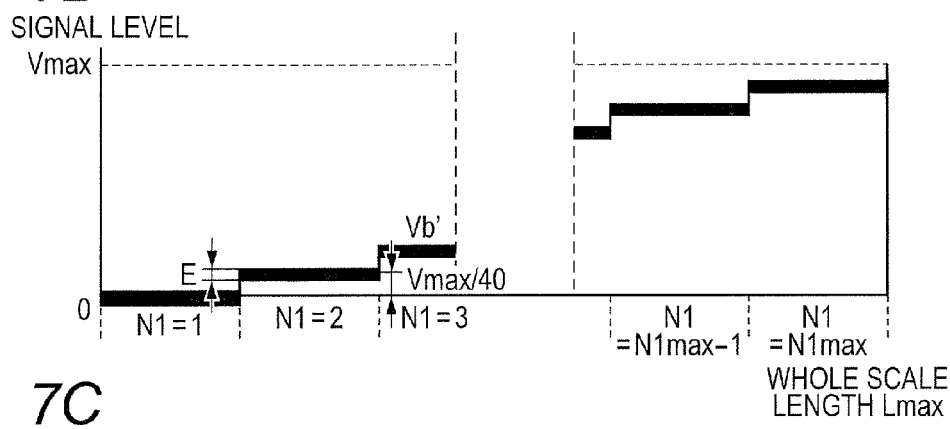
FIG. 7B is a graph showing changes in waveform in synchronization calculation.

FIG. 7A shows the waveforms of Inc1, Pv1, Inc1/N1max. Subtracting Inc1/N1max having the same inclination as that of Pv1 from the waveform of Pv1 will generate a stepped waveform having the error component E shown in FIG. 7B. A signal level Vb' of the waveform shown in FIG. 7B is represented by equation (13). In this case, the signal level in a single step of the stepped waveform is represented by Vmax/N1max:

$$Vb' = Pv1 - (Inc1/N1max) \quad (13)$$

Figure 7C:
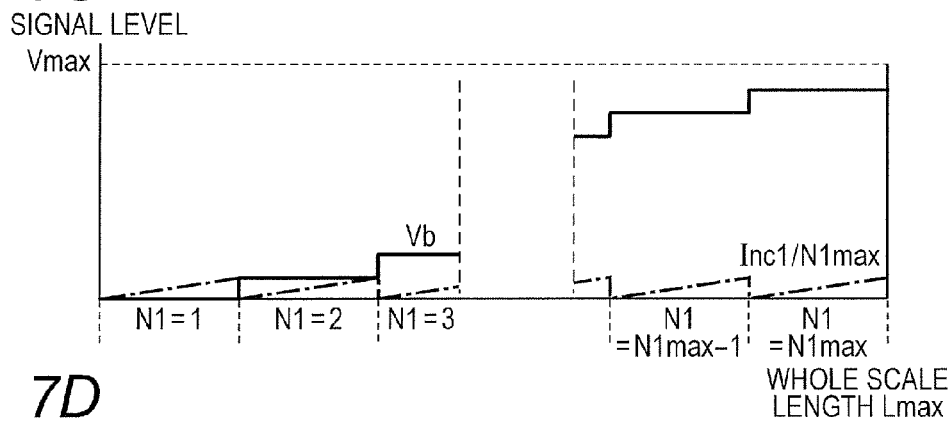
FIG. 7C is a graph showing changes in waveform in synchronization calculation.

Removing the error component E of the waveform shown in FIG. 7B by rounding off will obtain the waveform shown in FIG. 7C. A signal level Vb of the waveform shown in FIG. 7C is represented by $$Vb = \text{Round}[\{Pv1 - (Inc1/N1max)\} \times (N1max/Vmax)] \times (Vmax/N1max) \quad (14)$$

where Round[ ] is a function for rounding off to the first decimal place.

In addition, the error component E can be represented by $$E = \{Pv1 - (Inc1/N1max)\} - Vb \quad (15)$$

Figure 7D:
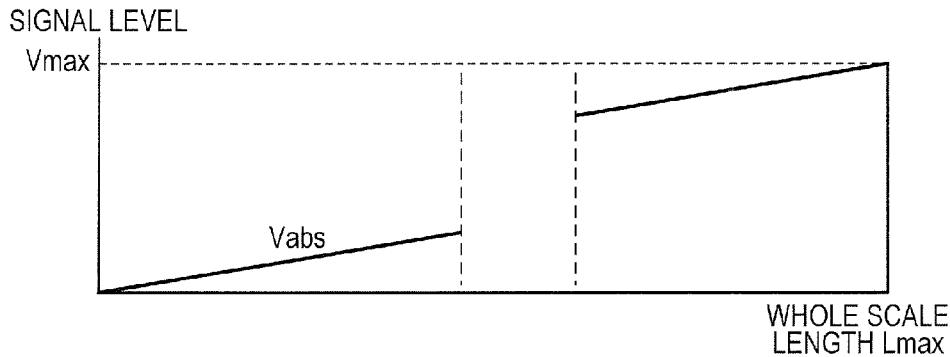
FIG. 7D is a graph showing changes in waveform in synchronization calculation.

Adding the waveform of Inc1/N1max to the waveform shown in FIG. 7C will generate the signal level Vabs indicating an absolute position from which the error component E is removed, as shown in FIG. 7D. The ABS calculating unit executes this synchronisation calculation according to equation (16):

$$Vabs = Vb + (Inc1/N1max) \quad (16)$$

The absolute position Pabs is represented from the signal level Vabs of the absolute position by $$Pabs = Vabs \times (Lmax/Vmax) \quad (17)$$

After calculation of the absolute position Pabs in step S507, the process advances to step S508 to terminate the processing.

With the above operation, the absolute position. Pabs can be calculated.

Reliability determination of absolute position calculation information, and an absolute position will be described next.

Figure 8:
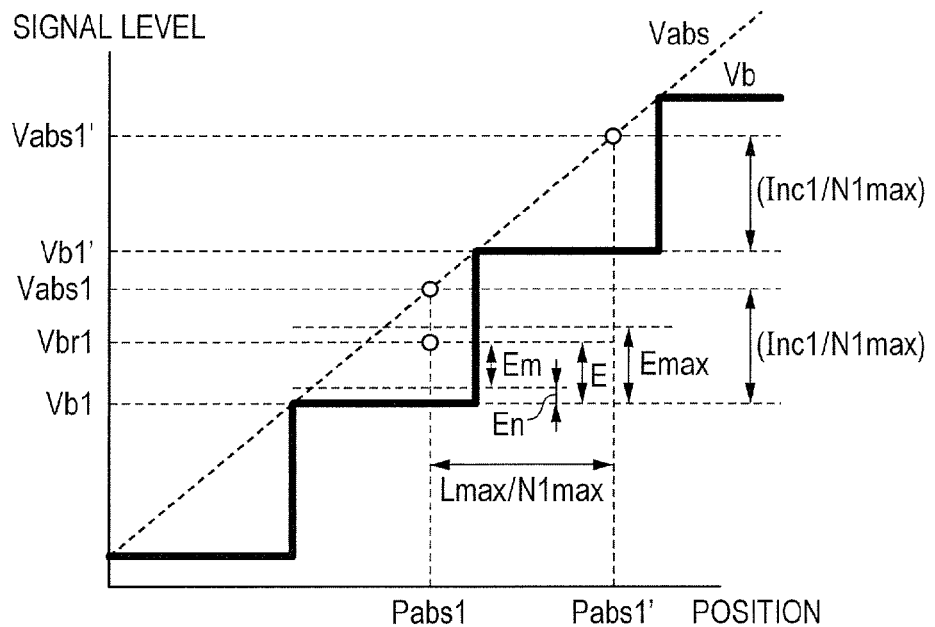
FIG. 8 is a graph for explaining error components in synchronization calculation.

FIG. 8 is an enlarged view of the waveform in FIG. 7C. In this case, Emax represents the maximum value of the error component E which can be removed by equation (14). Since the error component. E is removed by rounding off according to equation (14), Emax is half Vmax/N1max, and is represented by $$Emax = Vmax/(N1max \times 2) \quad (18)$$

Vbr1 represents the signal level calculated at an absolute position Pabs1 by using equation (13). In addition, Vb1 and Vb1' represent the signal levels calculated at the absolute position Pabs1 by using equation (14). In this case, Vb1 represents a signal level obtained by properly removing the error component. E according to equation (14), and Vb1' represents a signal level when the error component E exceeds Emax and the proper error component E cannot be removed.

When Vb1 is calculated by equation (14), the absolute position is calculated as the absolute position Pabs1 by equation (16). When Vb1' is calculated according to equation (14), the absolute position is calculated as a position Pabs1' shifted from the position Pabs1 by Lmax/N1max according to equation (16).

With the above operation, a miscalculation occurs in an absolute position. The error component E that prevents a miscalculation in an absolute position is represented by equation (19) according to equation (13):

$$E < Emax = Vmax/(N1max \times 2) \quad (19)$$

The following are conceivable as the error component E: an error component En originating from noise components contained in S1rA, S1rB, S2rA, and S2rB; and an error component Em generated upon the movement of the movable member 21 during a signal acquisition delay time Ts. Equation (20) represents the relationship between the error component E, the error component. En originating from noise components such as disturbances, and the error component Em generated upon movement of the movable member 21 during the signal acquisition delay time Ts:

$$E = En + Em \quad (20)$$

In this case, since the Vernier signal Pv1 is the difference between the first relative position signal Inc1 and the second relative position signal Inc2, the relationship between a noise component En1 of the first relative position signal Inc1, a noise component En2 of the second relative position signal Inc2 and the error component En originating from noise components can be represented by equation (21) according to equation (13):

$$En = En1 \times \{(N1max - 1)/N1max\} + En2 \quad (21)$$

En1 and En2 are calculated by measurement in advance and retained as fixed values in the reliability reference retaining unit 107. Therefore, the error component Em as a variable factor can be represented by equation (22) given below.

In this case, the error component Em can be regarded as the amount of change in signal level caused by the shift of the second relative position signal Inc2 with reference to the first relative position signal Inc1.

If, therefore, the moving amount of the movable member 21 within the time elapsed before S1rA, S1rB, S2rA, and S2rB are acquired is defined as ΔPv, the error component Em is represented by equation (22):

$$Em = N2max \times Vmax \times \Delta Pv/Lmax \quad (22)$$

In this case, eliminating E, Em, and En by using equations (19), (20), (21), and (22) will obtain $$\Delta P_v < \frac{L_{max}}{N1_{max} \times N2_{max} \times 2} - \frac{L_{max}}{V_{max} \times N2_{max}}\left(En1 \times \frac{N2_{max}}{N1_{max}} + En2\right)$$

In this case, if a threshold ΔPvmax of ΔPv indicating the generation limit of a miscalculation in an absolute position is represented by $$\Delta P_{vmax} = \frac{L_{max}}{N1_{max} \times N2_{max} \times 2} - \frac{L_{max}}{V_{max} \times N2_{max}}\left(En1 \times \frac{N2_{max}}{N1_{max}} + En2\right) \quad (23)$$

then the relationship between threshold ΔPvmax and ΔPv is represented by $$\Delta Pv < \Delta Pvmax \quad (24)$$

As described above, since all the right-hand side values of equation (23) are fixed values, the threshold ΔPvmax that avoids the generation of a miscalculation in an absolute position is uniquely determined relative to a moving amount (relative change amount) ΔPv by which the movable member 21 has moved relative to the fixed member 22 within the time elapsed (predetermined period) before S1r A, S1r B, S2rA, and S2rB are acquired.

Absolute position calculation information for determining the reliability of the absolute position Pabs therefore includes a signal acquisition delay concerning S1rA, S1rB, S2rA, and S2rB and the moving amount ΔPv of the movable member 21 during the signal acquisition delay time. In addition, when the moving amount ΔPv satisfies inequality (24), the ABS determining unit 101 determines that, the reliability of the absolute position Pabs is high, and decides an absolute position. A method of calculating the moving amount ΔPv will be described later.

In this case, equation (23) represents the threshold ΔPvmax for ΔPv when equation (14) for removing the error component E is used once. When calculating the absolute position Pabs by performing the processing represented by a plurality of equations (14) using a plurality of Vernier signals, it is necessary to obtain ΔPvmax in calculation of each equation (14). When the moving amount ΔPv does not exceed the minimum value of the respective thresholds ΔPvmax, it is possible to determine that, the reliability of the absolute position Pabs is high.

With regard to the error component En based on the noise component calculated by equation (21), this embodiment calculates the Vernier signal Pv1 from the difference between the first relative position signal Inc1 and the second relative position signal Inc2. Note however that when calculating the Vernier signal Pv1 from the difference between the signals obtained by multiplication of the periods of the first, relative position signal Inc1 and second relative position signal Inc2, it is necessary to calculate the error component En in consideration of a multiplication rate. More specifically, it is necessary to calculate the error component En based on noise components from the values obtained by multiplying En1 and En2 by the magnification of multiplication.

A method of calculating the moving amount ΔPv will be described next.

Figure 9:
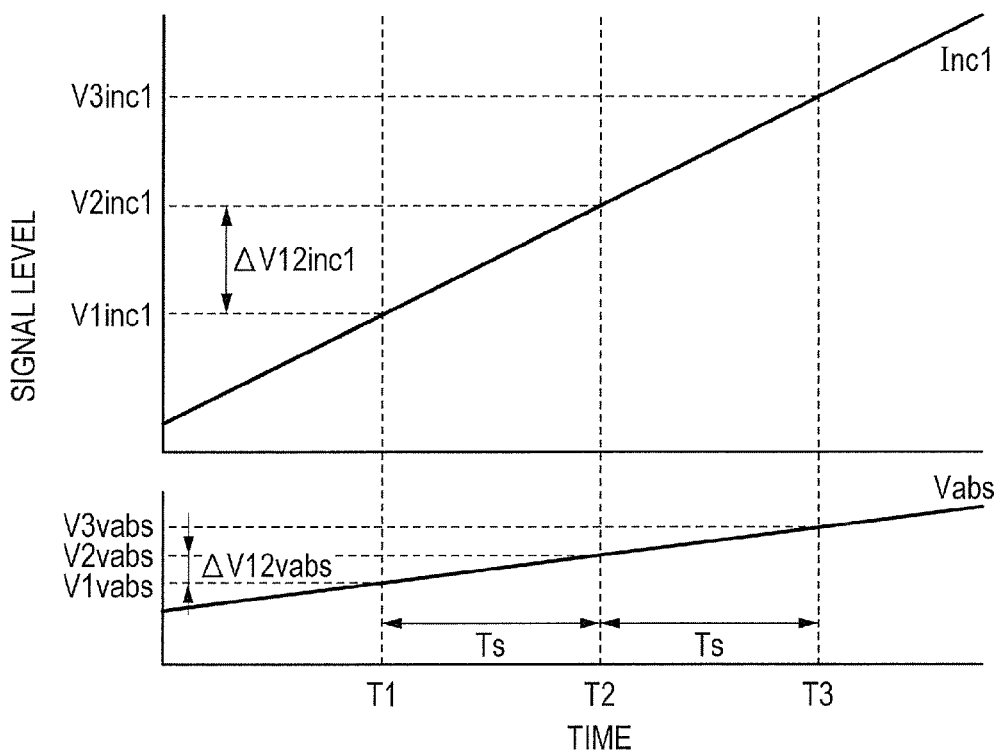
FIG. 9 is a graph showing the relationship between the first relative position signal and a Vernier signal at a signal acquisition time.

FIG. 9 shows the relationship between the signal levels of Inc1 and Vabs when the movable member 21 is moving. Referring to FIG. 9, the abscissa represents time; and the ordinate, signal level. T1 and T3 represent the times when the signals S1r A and S1r B are acquired, and T2 represents the time when the signals S2rA and S2rB are acquired. In this case, the time intervals between T1 and T2 and between T2 and T3 are the signal acquisition delay time Ts. These time intervals are the same each other. The signal acquisition delay time Ts is set to the time by which each of the signals S1r A, S1r B, S2rA, and S2r3 is sufficiently stabilized after they are switched. V1vabs, V2vabs, and V3vabs represent the signal levels of Vabs at times T1, T2, and T3 respectively. In addition, V1inc1, V2inc1, and V3inc1 represent the signal levels of Inc1 at times T1, T2, and T3 respectively. ΔV12inc1 represents the amount of change in the signal level of Inc1 in the interval from T1 to T2, and ΔV12vabs represents the amount of change in the signal level of Vabs in the interval from T1 to T2.

In this case, it is possible to calculate the absolute position Pabs by acquiring the signals S1r A and S1r B at T1 and the signals S2rA and S2rB at T2. However, in order to calculate the moving amount ΔPv of the movable member 21 at the times of acquisition of S1r A, S1r B, S2rA, and S2rB, the signals S1r A and S1r B are acquired at the timing of T3.

Assume that the movable member 21 moves at a constant velocity. Since T1, T2, and T3 are at equal intervals, ΔV12inc1 can be represented by $$\Delta V12inc1 = (V3inc1 - V1inc1)/2 \quad (25)$$

Figure 5:
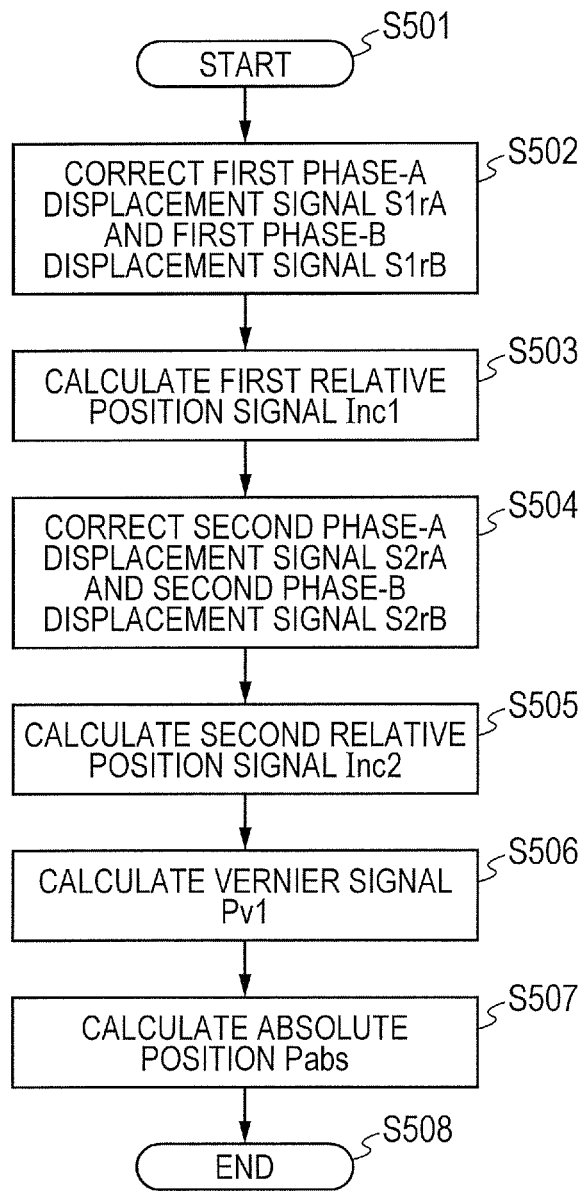
FIG. 5 is a flowchart of absolute position calculation.

In this case, it is possible to calculate V1inc1 and V3inc1 from S1r A and S1r B acquired at the timings of T1 and T3 by the processing in steps S502 and S503 in FIG. 5.

In addition, since Vabs has one period with respect to the whole scale length Lmax, and Inc1 has N1max periods, ΔV12vabs can be represented by $$\Delta V12vabs = \Delta V12inc1/N1max \quad (26)$$

The moving amount ΔPv can be calculated from ΔV12Vabs according to equation (27):

$$\Delta Pv = \Delta V12vabs \times (Lmax/Vmax) \quad (27)$$

With the above operation, the Vernier-type position detection apparatus can prevent erroneous absolute position calculation and calculate a highly reliable absolute position while implementing the miniaturization of a circuit arrangement.

Second Embodiment

The second embodiment of the present invention will be described next with reference to FIG. 10.

Figure 10:
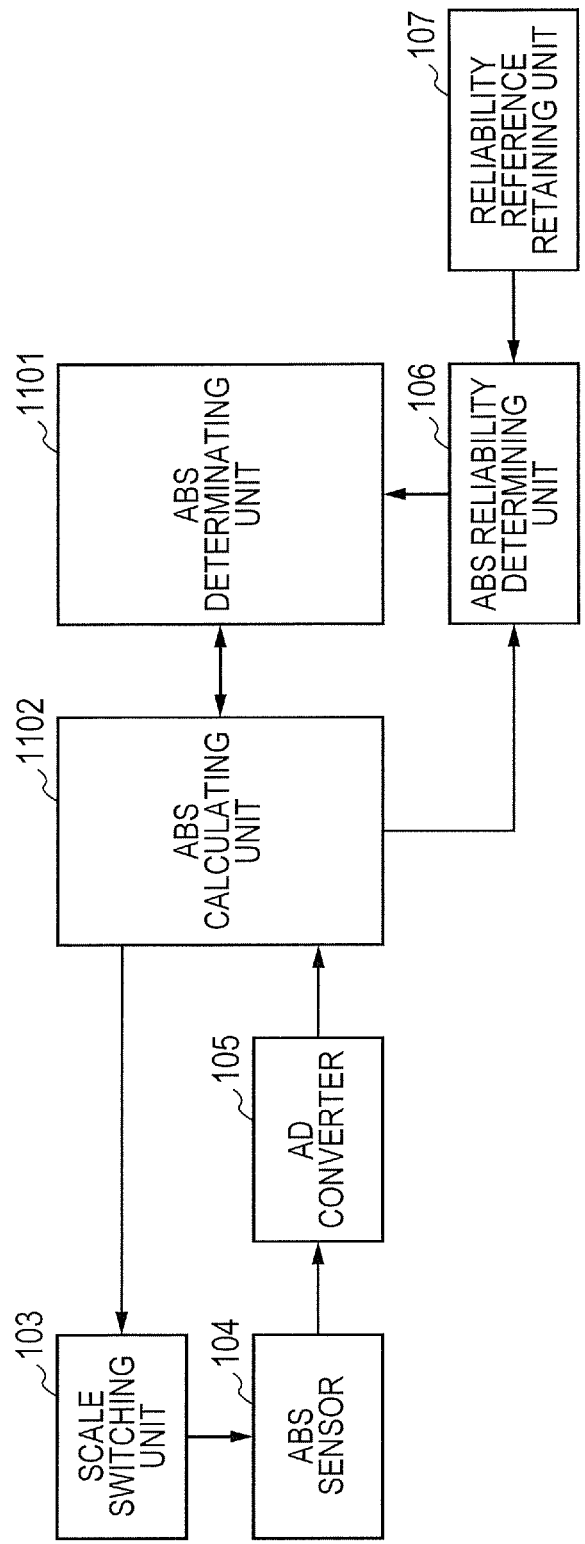
FIG. 10 is a block diagram showing the arrangement of the second embodiment.

FIG. 10 is a block diagram showing the arrangement of this embodiment. The same reference numerals as in FIG. 1 denote the same components in FIG. 10.

An ABS determining unit 1101 is an absolute position determining unit which determines an absolute position Pabs calculated by an ABS calculating unit 1102 based on the determination result obtained by the an ABS reliability determining unit. The ABS determining unit 1101 performs processing different from that performed by the ABS determining unit 101. The ABS calculating unit 1102 is a calculating unit which calculates the absolute position Pabs as the absolute position of a movable member relative to a fixed member based on the signal output from an ABS sensor. The ABS calculating unit 1102 operates differently from the ABS calculating unit 102.

The operation of the second embodiment will be described next.

The ABS determining unit 1101 requests the ABS calculating unit 1102 to calculate the absolute position Pabs. The ABS calculating unit 1102 calculates the absolute position Pabs by the same method as that in the first embodiment, and outputs absolute position calculation information to the ABS reliability determining unit 106. The ABS reliability determining unit 106 performs reliability determination by the same method as that in the first embodiment, and outputs the result to the ABS determining unit 1101. In this case, if the ABS reliability determining unit 106 determines that the reliability of the absolute position Pabs is low, the ABS determining unit 1101 re-requests the ABS calculating unit 1102 to calculate the absolute position Pabs. Upon receiving the re-request to calculate the absolute position Pabs, the ABS calculating unit 1102 calculates the absolute position Pabs again.

Figure 11:
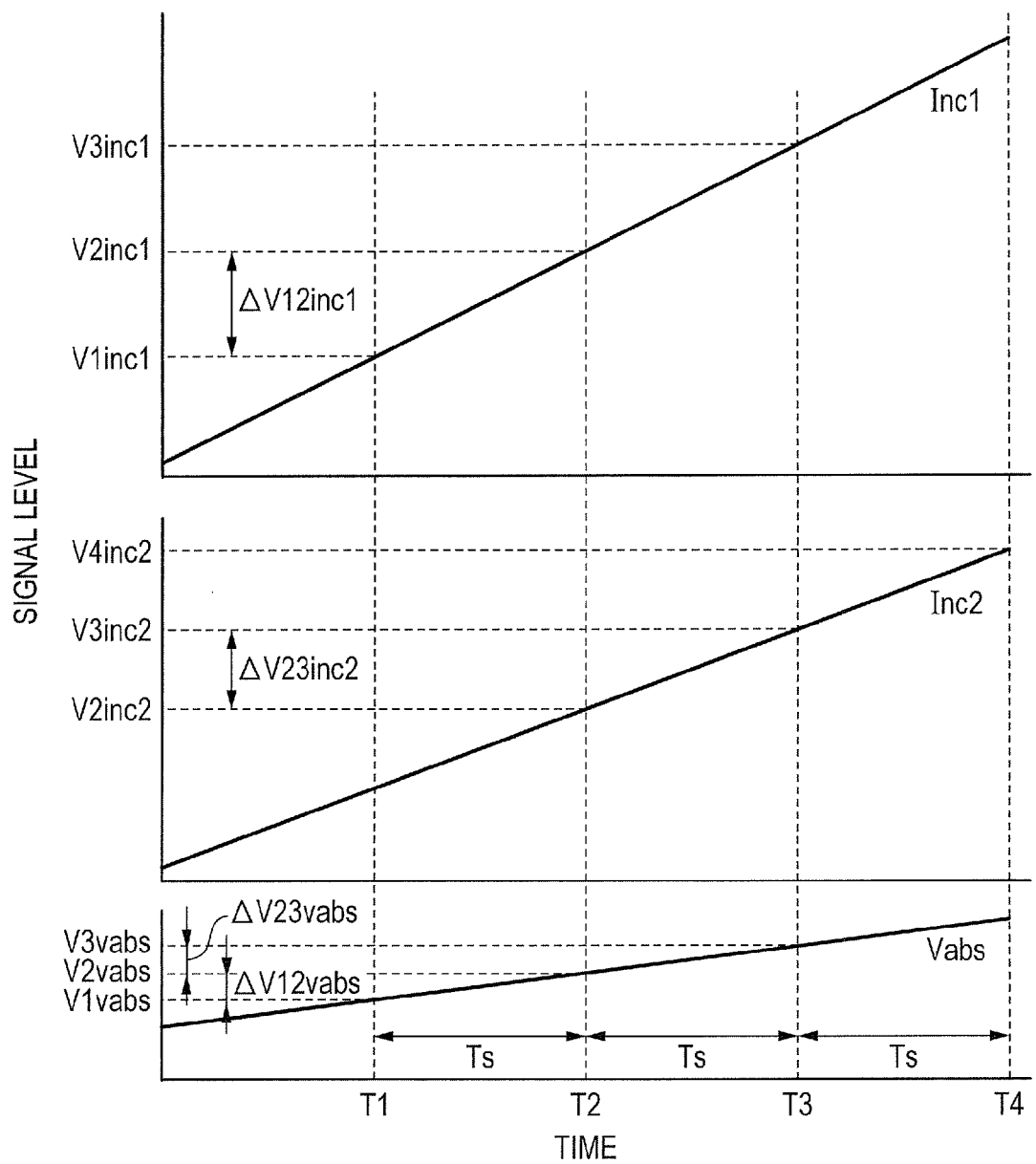
FIG. 11 is a graph showing the relationship between the first and second relative position signals and a Vernier signal at a signal acquisition time.

A method of re-calculating the absolute position Pabs will be described next with reference to FIG. 11.

T4 represents the time when signals S2rA and S2rB are acquired. The time intervals between T1 and T2, T2 and T3, and T3 and T4 are the same as a signal acquisition delay time Ts respectively. V2inc2, V3inc2, and V4inc2 represent the signal levels of Inc2 at times T2, T3, and T4. ΔV23inc2 represents the amount of change in the signal level of Inc2 in the interval from T2 to T3. ΔV23vabs represents the amount of change in the signal level of Vabs in the interval from T2 to T3.

If a moving amount ΔPv calculated from the signals S1rA and S1rB acquired at the timing of T3 exceeds ΔPvmax, the ABS calculating unit 1102 acquires the signals S2rA and S2rB again at the timing of T4.

The intervals between T2, T3, and T4 are equal to each other. Assuming that a movable member 21 is moving at a constant velocity, therefore, ΔV23inc2 can be represented by $$\Delta V23inc2 = (V4inc2 - V2inc2)/2 \qquad (28)$$

In this case, it is possible to calculate V2inc2 and V4inc2 from S2rA and S2rB acquired at the timings of T2 and T4 by the processing in steps S502 and S503 in FIG. 5. In addition, since Vabs has one period with respect, to a whole scale length Lmax and Inc2 has N2max (the maximum value of N2) periods within the whole scale length Lmax, ΔV23vabs can be expressed by equation (29) within the range in which Vabs and Inc2 take continuous values.

$$\Delta V23vabs = \Delta V23inc2/N2max \qquad (29)$$

The moving amount ΔPv can be calculated from ΔV23vabs and equation (30):

$$\Delta Pv = \Delta V23vabs \times (Lmax/Vmax) \qquad (30)$$

With the above operation, the apparatus calculates the moving amount ΔPv in the interval from T2 to T3.

On the other hand, it is possible to calculate absolute position Pabs from S2rA and S2rB acquired at T2 and S1rA and S1rB acquired at T3 by the method in the first embodiment.

In this case, if the moving amount ΔPv in the interval from T2 to T3 is smaller than ΔPvmax, the apparatus determines that, the reliability of the absolute position Pabs calculated from S2rA and S2rB acquired at T2 and S1rA and S1rB acquired at T3 is high.

The apparatus repeats above calculation of the absolute position Pabs until determining that the reliability of the absolute position Pabs is high.

With the above operation, the apparatus sequentially acquires S1rA, S1rB, S2rA, and S2rB, and sequentially calculates the absolute position Pabs from sequentially acquired S1rA, S1rB, S2rA, and S2rB. This makes it possible to quickly determine the absolute position Pabs with high reliability.

Third Embodiment

The third embodiment of the present invention will be described next with reference to FIG. 12.

Figure 12:
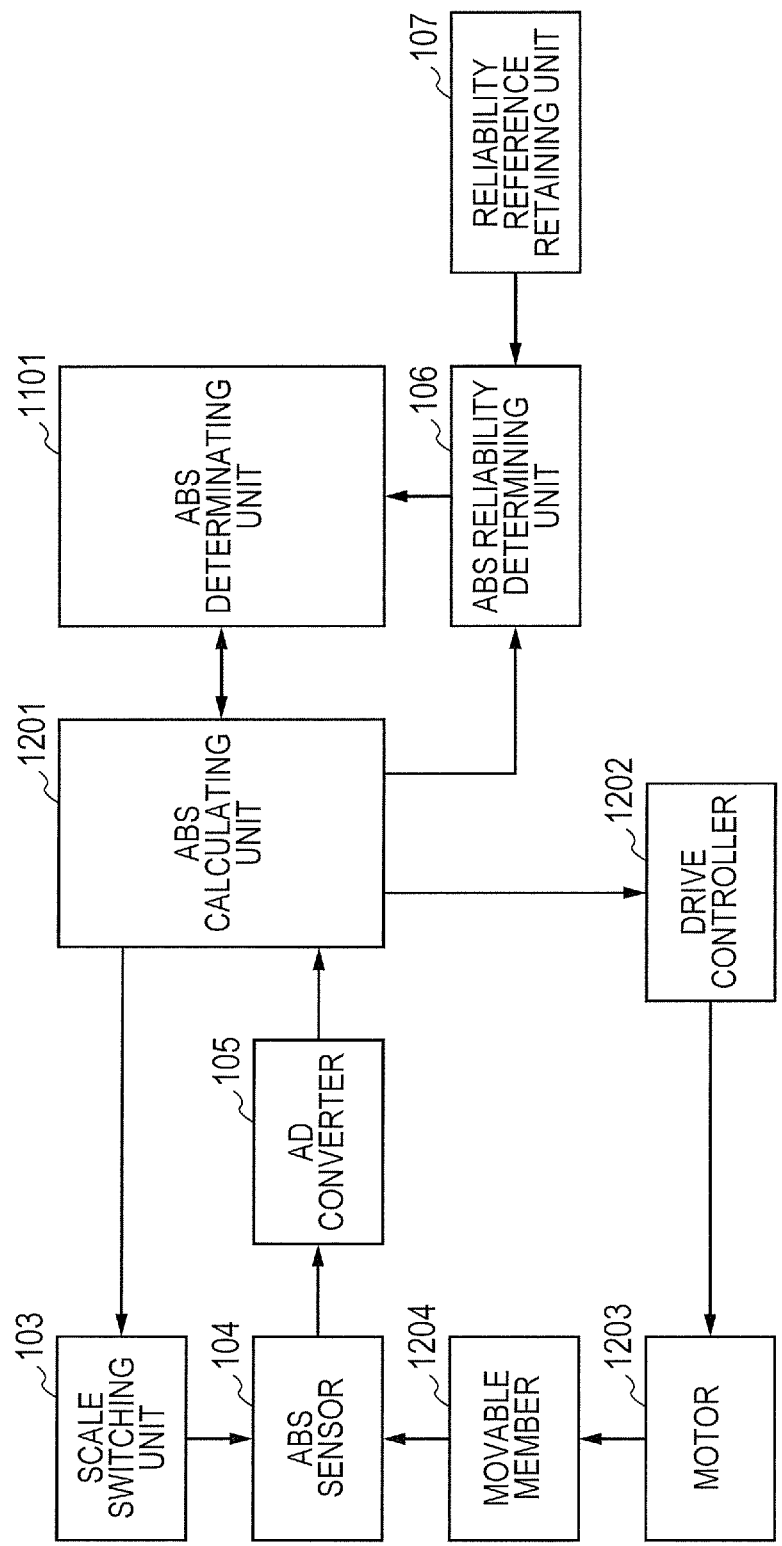
FIG. 12 is a block diagram showing the arrangement of the third embodiment.

FIG. 12 is a block diagram showing the arrangement of this embodiment. The same reference numerals as in FIG. 10 denote the same components in FIG. 12.

An ABS calculating unit 1201 is a calculating unit which calculates an absolute position Pabs as the absolute position of a movable member relative to a fixed member based on the signal output from an ABS sensor. The ABS calculating unit 1201 operates differently from an ABS calculating unit 1102. A drive controller 1202 performs drive control of a movable member 1204. A motor 1203 drives the movable member 1204. The motor 1203 is, for example, a DC motor or stepping motor. The movable member 1204 is an absolute position detection target by an ABS sensor 104.

The operation of the third embodiment will be described next.

An ABS determining unit 1101 requests the ABS calculating unit 1201 to calculate the absolute position Pabs. Upon receiving the request to calculate the absolute position Pabs from the ABS determining unit 1101, the ABS calculating unit 1201 requests the drive controller 1202 to perform drive control so as to make a moving amount ΔPv in a signal acquisition delay time Ts become a velocity Sabs satisfying inequality (24), that is, equal to or less than the velocity Sabs that satisfies inequality (24). Upon receiving the drive control request, the drive controller 1202 performs drive control of the motor 1203 so as to make the moving velocity of the movable member 1204 become equal to or less than the velocity Sabs. The ABS calculating unit 1201 acquires S1rA and S1rB at intervals of the signal acquisition delay time Ts, and sequentially calculates the moving amount ΔPv at time Ts by using equation (31).

$$\Delta Pv = (\Delta Vinc1/N1max) \times (Lmax/Vmax) \qquad (31)$$

where ΔVinc1 is a signal level to which Inc1 has changed during the signal acquisition delay time Ts.

If the calculated, moving amount ΔPv satisfies inequality (24), the ABS calculating unit 1201 starts calculating the absolute position Pabs and calculates the absolute position Pabs by using the same method as that in the first embodiment.

With the above operation, it is possible to quickly determine a highly reliable absolute position by controlling the moving velocity of the movable member 1204 to the velocity at which highly reliable absolute position calculation is performed.

This embodiment is configured to control the moving velocity of the movable member 1204 by drive control. However, it is possible to obtain the same effect as that described above by an arrangement configured to set the velocity of the movable member 1204 to the absolute position calculation velocity that, ensures high reliability at the time of absolute position calculation by providing the movable member 1204 with a lock mechanism or a mechanism of increasing drive torque.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-083505, filed Apr. 12, 2013, which is hereby incorporated by reference herein in its entirety.

What is claimed is:

1. A position, detection, apparatus which detects a position of a movable member relative to a fixed member, the position detection apparatus comprising:
   a signal detector configured to detect a plurality of periodic signals which respectively indicate predetermined values concerning a position of the movable member relative to the fixed member and change at different periods in accordance with a change in the position;
   a signal processing unit configured to generate a plurality of displacement signals based on the plurality of periodic signals detected by the signal detector and sequentially output the plurality of generated displacement signals while switching the signals at a predetermined period;
   a position calculating unit configured to calculate a position of the movable member relative to the fixed member based on the plurality of displacement signals; and
   a reliability determining unit configured to determine that reliability of the position calculated by the position calculating unit is low if a displacement amount of the movable member in the predetermined period is larger than a predetermined threshold.

2. The position detection apparatus according to claim 1 further comprising a data retaining unit configured to store a maximum displacement of the movable member relative to the fixed member and the number of periods of the plurality of periodic signals within, the maximum displacement,
   wherein the predetermined threshold is determined based on the maximum displacement of each of the plurality of periodic signals and the number of periods of the plurality of periodic signals within the maximum displacement.

3. The position detection apparatus according to claim 1 comprising a data retaining unit configured to store noise of each of the plurality of periodic signals, a maximum displacement of the movable member relative to the fixed member, and the number of periods of the plurality of periodic signals within the maximum displacement, wherein the predetermined threshold is determined based on the noise of each of the plurality of periodic signals, the maximum displacement, and the number of periods of the plurality of periodic signals within the maximum displacement.

4. The position detection apparatus according to claim 1, wherein if the reliability determining unit, determines that reliability is low, the position calculating unit acquires the displacement signal output from the signal output unit at a timing of a next predetermined period, and re-calculates a position.

5. The position detection apparatus according to claim 1, further comprising a drive unit configured to drive the movable member,
   wherein the drive unit controls driving of the movable member so as to set a displacement amount of the movable member in the predetermined period to not more than the predetermined threshold.

6. The position detection apparatus according to of claim 1, wherein the signal detector includes
   a plurality of reflective pattern arrays respectively having different periods on one of the fixed member and the movable member,
   a light source fixed to the other of the fixed member and the movable member, and
      a plurality of light receiving units fixed to the other of the fixed member and the movable member and configured to respectively receive light emitted from the light source and reflected by the plurality of reflective pattern arrays.

7. The position detection apparatus according to claim 1, further comprising a switching unit configured to output, a switching signal to the signal processing unit to cause the signal processing unit to sequentially output a plurality of displacement, signals generated based on the plurality of periodic signals while switching the plurality of displacement signals at the predetermined period.

* * * * *